(12) United States Patent
Chang et al.

(10) Patent No.: US 10,120,715 B2
(45) Date of Patent: Nov. 6, 2018

(54) DISTRIBUTED NETWORK MANAGEMENT SYSTEM AND METHOD FOR A VEHICLE

(71) Applicant: Automotive Research & Testing Center, Changhua County (TW)

(72) Inventors: Che-Cheng Chang, Changhua County (TW); Chao-Yang Lee, Changhua County (TW); Yi-Chen Lu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 308 days.

(21) Appl. No.: 14/965,883

(22) Filed: Dec. 10, 2015

(65) Prior Publication Data

US 2017/0171036 A1 Jun. 15, 2017

(51) Int. Cl.
*G06F 9/50* (2006.01)
*H04L 29/08* (2006.01)
*G06F 11/00* (2006.01)
*H04L 12/24* (2006.01)

(52) U.S. Cl.
CPC ............... *G06F 9/50* (2013.01); *H04L 67/10* (2013.01); *H04L 67/1008* (2013.01); *H04L 67/1034* (2013.01); *H04L 67/12* (2013.01); *H04L 67/125* (2013.01); *H04L 67/327* (2013.01); *H04L 41/0654* (2013.01)

(58) Field of Classification Search
CPC combination set(s) only.
See application file for complete search history.

(56) References Cited

U.S. PATENT DOCUMENTS

| 5,305,314 | A  | * | 4/1994 | Edblad | H04L 12/433 |
| | | | | | 370/450 |
| 7,729,827 | B2 | | 6/2010 | Sakurai et al. | |
| 8,509,058 | B2 | * | 8/2013 | Taylor | H04L 45/10 |
| | | | | | 370/217 |
| 8,556,509 | B2 | | 10/2013 | Sung et al. | |
| 8,761,000 | B2 | * | 6/2014 | Knox | H04W 28/08 |
| | | | | | 370/218 |
| 8,832,819 | B2 | * | 9/2014 | Johnson | G06F 11/2002 |
| | | | | | 709/239 |
| 8,970,703 | B1 | * | 3/2015 | Thomas, II | H04N 5/76 |
| | | | | | 348/159 |
| 9,092,395 | B2 | * | 7/2015 | Bradfield | G06F 11/20 |
| 2011/0078490 | A1 | * | 3/2011 | He | H04L 41/0668 |
| | | | | | 714/4.11 |

(Continued)

FOREIGN PATENT DOCUMENTS

TW 420771 B 2/2001

*Primary Examiner* — Amine Riad
(74) *Attorney, Agent, or Firm* — CKC & Partners Co., Ltd.

(57) ABSTRACT

A distributed network management method for a vehicle is provided. The distributed network management method includes a first step, a second step, a third step and a fourth step. The first step is for preforming a re-configuring action and a pre-defining action to a plurality of network messages transmitted through a plurality of nodes. The second step is for defining a leading node form the nodes. The third step is for detecting a failed node from the nodes. The fourth step is for defining at least one idle node by the leading node according to a task load of each of the nodes, thereby assigning a task of the failed node to the idle node.

21 Claims, 14 Drawing Sheets

(56) References Cited

U.S. PATENT DOCUMENTS

| | | | | |
|---|---|---|---|---|
| 2011/0280178 A1* | 11/2011 | Heifner | .................. | H04B 7/185 370/325 |
| 2012/0089863 A1* | 4/2012 | Goto | ................... | G06F 11/2035 714/4.11 |
| 2012/0236709 A1* | 9/2012 | Ramachandran | ... | H04W 76/027 370/221 |
| 2013/0091378 A1* | 4/2013 | Taylor | ..................... | H04L 45/10 714/4.11 |
| 2013/0205161 A1* | 8/2013 | Patani | ................. | G06F 11/2028 714/4.11 |
| 2015/0006741 A1* | 1/2015 | Narayanan | .............. | H04L 69/40 709/227 |
| 2016/0129789 A1* | 5/2016 | Halford | ................. | B60W 50/14 701/36 |
| 2017/0093643 A1* | 3/2017 | Ricci | ....................... | H04L 41/14 |
| 2017/0163476 A1* | 6/2017 | Killadi | ................ | H04L 41/0668 |
| 2017/0344444 A1* | 11/2017 | Costa-Roberts | .... | G06F 11/2007 |

\* cited by examiner

DISTRIBUTED NETWORK MANAGEMENT SYSTEM AND METHOD FOR A VEHICLE

BACKGROUND

Technical Field

The present disclosure relates to a network management system and method, especially relates to a distributed network management system and method for a vehicle.

Description of Related Art

An Advanced Driver Assistance System (ADAS) is an integrated solution for a smart vehicle concerning driving safety and intelligent driving. The ADAS is introduced to a high class vehicle to provide vehicle driving messages and driving environment messages to the driver, and to integrate the driver's driving commands to assist the vehicle to travel, shift or stop intelligently. Furthermore, the ADAS is also capable of providing warning information to the driver in order to respond early.

For providing more safety and intelligent driving functionalities, the aforementioned ADAS commonly includes subsystems having different functionalities, such as a Blind Spot Detecting System, a Backup Parking Aid System, a Rear Crash Collision Warning System, a Lane Departure Warning System, a Collision Mitigation System, an Adaptive Front-lighting System, a Night Vision System, an Adaptive Cruise Control System, a Pre-Crash System, a Parking Aid System, a Forward Collision Warning System and a Tire Pressure Monitoring System. It's also possible to include other subsystems with different functionalities in the future.

In the ADAS, nodes on a vehicular network are used for transmitting the sensing data of the sensors and executing the command of the electronic control unit. However, once the electronic control unit is failed, the task thereof cannot be normally executed, thereby reducing the driving safety. More importantly, conventional vehicular network doesn't have complete functionalities of fault detection, fault analysis and fault tolerance. An extra backup hardware is required to execute the task of the failed electronic control unit, thus the hardware cost is huge and the task is still cannot be executed when the backup hardware is failed.

SUMMARY

According to one aspect of the present disclosure, a distributed network management system for a vehicle is provided. The distributed network management system is disposed on a plurality of electronic control units that are inter-connected via a network. The distributed network management system includes a plurality of data configuration modules, a plurality of data definition modules, a plurality of distributed node status broadcast modules, a plurality of task transformation modules, a plurality of task overload modules and a plurality of task load balance modules. Each of the data configuration modules is disposed on each of the electronic control units, and each of the data configuration modules is configured for performing a re-configuring action to a plurality of network messages. Each of the data definition modules is disposed on each of the electronic control units and is connected to each of the data configuration modules, and each of the data definition modules is configured for performing a pre-defining action corresponding to the network messages. Each of the distributed node status broadcast modules is disposed on each of the electronic control units, and each of the distributed node status broadcast module is configured for selecting one of the electronic control units to perform a task assigning action. Each of the task transformation modules is disposed on each of the electronic control units, and each of the task transformation modules is configured for selecting one of the electronic control units to perform a task transferring action. Each of the task overload modules is disposed on each of the electronic control units, and each of the task overload modules is configured for selecting one of the electronic control units to perform a task overloading action. Each of the task load balance modules is disposed on each of the electronic control units, and each of the task overload modules is configured for selecting one of the electronic control units to perform a task load balancing action. Wherein one of the electronic control units performs the task assigning action to order the other of the electronic control units through one of the distributed node status broadcast modules; when any one of the electronic control units is failed and cannot perform any tasks, one of the electronic control units performs the task transform action, the task overloading action and the task balancing action to order the other of the electronic control units to perform the tasks of the failed electronic control unit through one of the task transformation modules, one of the task overload modules and one of the task balance modules respectively.

According to another aspect of the present disclosure, a distributed network management system for a vehicle is provided, the distributed network management system includes a plurality of electronic control units, a portable electronic control unit, a plurality of data configuration modules, a plurality of data definition modules, a plurality of distributed node status broadcast modules, a plurality of task transformation modules, a plurality of task overload modules and a plurality of task load balance modules. The electronic control units are inter-connected by a network. The portable electronic control unit is detachably connected to the electronic control units by the network. Each of the data configuration modules is disposed on each of the electronic control units and the portable electronic control unit, and each of the data configuration modules is configured for re-configuring a plurality of network messages. Each of the data definition modules is disposed on each of the electronic control units and the portable electronic control unit and is connected to each of the data configuration modules, and each of the data definition modules is configured for performing a pre-defining action corresponding to the network messages. Each of the distributed node status broadcast modules is disposed on each of the electronic control units and the portable electronic control unit, and each of the distributed node status broadcast module is configured for enabling the portable electronic control unit to perform a task assigning action. Each of the task transformation modules is disposed on each of the electronic control units and the portable electronic control unit, and the portable electronic control unit performs a task transferring action through one of the electronic control units. Each of the task overload modules is disposed on each of the electronic control units and the portable electronic control unit, and the portable electronic control unit performs a task overloading action through one of the task overload modules. Each of the task load balance modules is disposed on each of the electronic control units and the portable electronic control unit, and the portable electronic control unit performs a task load balancing action through one of the task load balance modules. Wherein the portable electronic control performs the task assigning action to order the electronic control units through one of the distributed node status broadcast modules; when any one of the electronic control units is failed and cannot perform any tasks, the portable electronic control unit performs the task transform action, the task overloading action and the task balancing action to order the electronic control units to perform the tasks of the failed electronic control unit through one of the task transformation modules, one of the task overload modules and one of the task balance modules respectively.

According to still another aspect of the present disclosure, a distributed network management method for a vehicle is provided. The distributed network management method includes a data configuration step, a data definition step, a distributed node status broadcast step, a task transformation step, a task overload step and a task load balance step. The data configuration step is for preforming a re-configuring action to a plurality of network messages transmitted through a plurality of nodes. The data definition step is for performing a pre-defining action corresponding to the network messages. The distributed node status broadcast step is for selecting one of the electronic control units to perform a task assigning action. The task transformation step is for selecting one of the electronic control units to perform a task transferring action. The task overload step is for selecting one of the electronic control units to perform a task overloading action. The task load balance step is for selecting one of the electronic control units to perform a task load balancing action.

According to further another aspect of the present disclosure, a distributed network management method for a vehicle is provided. The distributed network management method includes a first step, a second step, a third step and a fourth step. The first step is for preforming a re-configuring action and a pre-defining action to a plurality of network messages transmitted through a plurality of nodes. The second step is for defining a leading node form the nodes. The third step is for detecting a failed node from the nodes. The fourth step is for defining at least one idle node by the leading node according to a task load of each of the nodes, thereby assigning a task of the failed node to the idle node.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
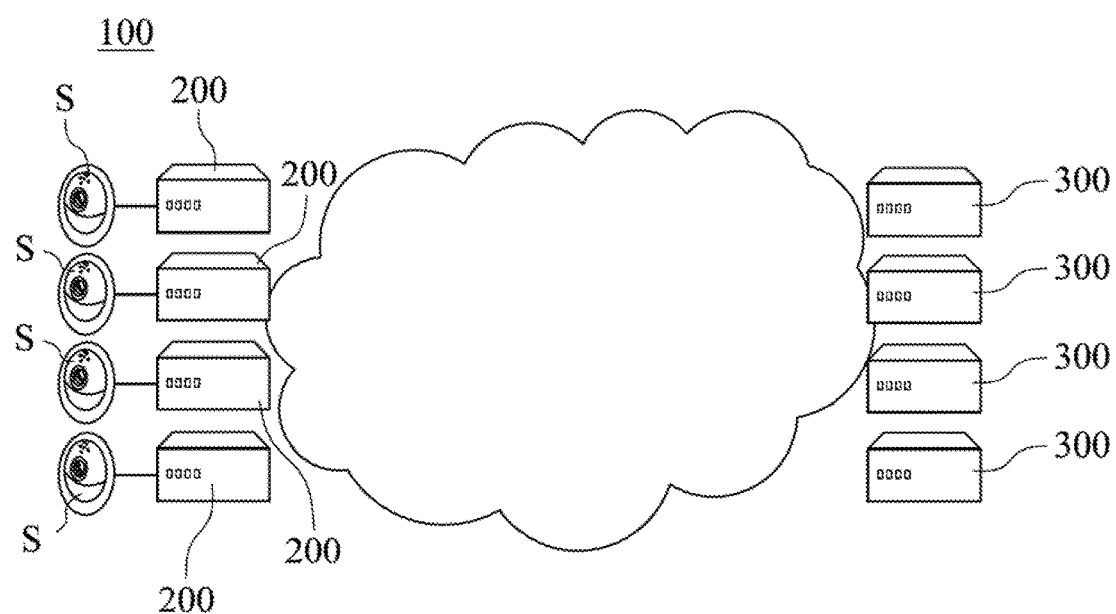
FIG. 1 is a schematic view showing a distributed network management system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides a distributed network management system and method for a vehicle, the system and the method are capable of providing functionalities of fault detection, fault analysis and fault tolerance.

Figure 2:
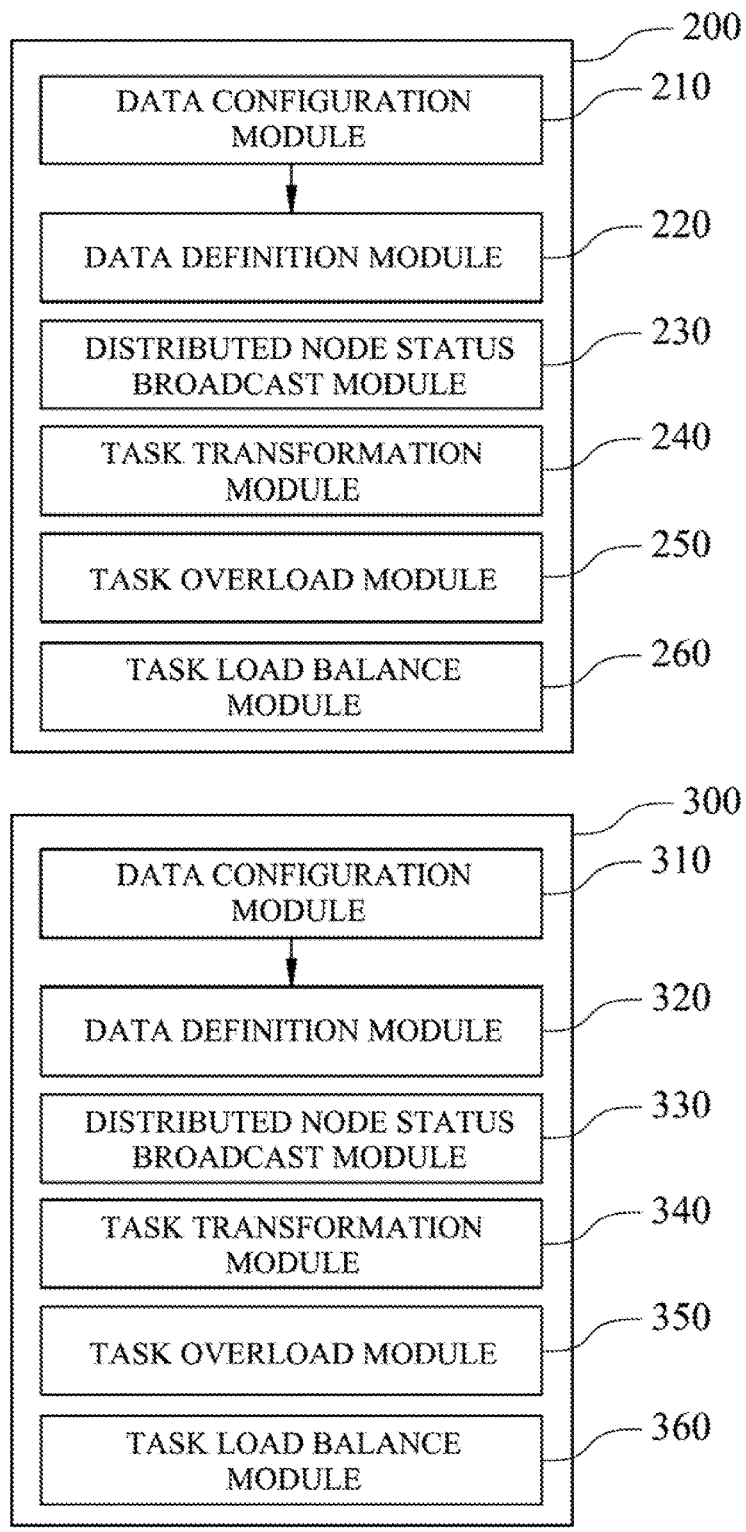
FIG. 2 is a block diagram showing electronic control units of a sensing end and a processing end of the distributed network management system of FIG. 1.

FIG. 1 is a schematic view showing a distributed network management system according to one embodiment of the present disclosure; and FIG. 2 is a block diagram showing electronic control units of a sensing end and a processing end of the distributed network management system of FIG. 1.

The distributed network management system 100 for a vehicle is composed of a plurality of sensors S, a plurality of electronic control units 200 in a sensing end and a plurality of electronic control units 300 in a processing end. The sensors S, the electronic control units 200 in the sensing end and the electronic control units 300 in the processing end are connected to each other through a network. In other word, the electronic control units 200 and the electronic control units 300 can be viewed as nodes in a distributed network, and network messages are transmitted between the electronic control units 200 and the electronic control units 300.

Each of the electronic control units 200 in the sensing end includes a data configuration module 210, a data definition module 220, a distributed node status broadcast module 230, a task transformation module 240, a task overload module 250 and a task load balance module 260. The electronic control units 200 in the sensing end are connected to the sensors S and receive sensing data of the network messages.

Each of the electronic control units 300 in the processing end includes a data configuration module 310, a data definition module 320, a distributed node status broadcast module 330, a task transformation module 340, a task overload module 350 and a task load balance module 360. The electronic control units 300 are connected to the electronic control units 200. The electronic control units 300 in the processing end analyze and process sensing data and output order data of the network messages to the electronic control units 300 in the sensing end.

The hardware structures of the electronic control units 200 in the sensing end and the electronic control units 300 in the processing end are well-known arts, there is no repeated herein again. Furthermore, the data configuration module 210, the data definition module 220, the distributed node status broadcast module 230, the task transformation module 240, the task overload module 250 and the task load balance module 260 of each of the electronic control units 200 have the same functionalities as the data configuration module 310, the data definition module 320, the distributed node status broadcast module 330, the task transformation module 340, the task overload module 350 and the task load balance module 360 of each of the electronic control units 300.

The data configuration modules 210, 310 are configured to perform a re-configuring action to the network messages. Here the re-configuring action is to define a source and a target of each of the network messages, and the re-configuring action can be performed online without re-encoding the network messages.

The data definition modules 220, 320 are configured to perform a pre-defining action. Here the pre-defining action is to define a type and a message ID of each of the network messages, which means that defining the message ID first then classifying the network messages.

The distributed node status broadcast module 230 in the electronic control units 200 and the distributed node status broadcast module 330 in the electronic control units 300 can select one leading node from each of the electronic control units 200 and each of the electronic control units 300. The leading node can perform a task assigning action to the other electronic control units 300 in the processing end.

The task transformation modules 240, 340 are for performing a task transferring action.

The task overload modules 250, 350 are for performing a task overloading action.

The task load balance modules 260, 360 are for performing a task balancing action.

When all of the network messages are re-configured and pre-defined online by the data configuration module 210, 310 and the data definition module 220, 320, the leading node (selected from one of the electronic control units 200 in the sensing end or one of the electronic control units 300 in the processing end) by the distributed node status broadcast module 230, 330 will perform task assigning action. Then, when any one of the electronic control units 300 is failed and cannot process sensing data and output order data, the leading node will assign the task to the electronic control units 300 in the processing end which are operated normally.

The distributed node status broadcast module 230 in the electronic control unit 200 and the distributed node status broadcast module 330 in the electronic control unit 300 are cooperated with each other. In other word, all of the distributed node status broadcast modules 230 and the distributed node status broadcast modules 330 are for selecting any one of the electronic control units 200 in the sensing end or any one of the electronic control units 300 in the processing end as a leading node to order all of the electronic control units 200 in the sensing end and all of the electronic control units 300 in the processing end.

Figure 3:
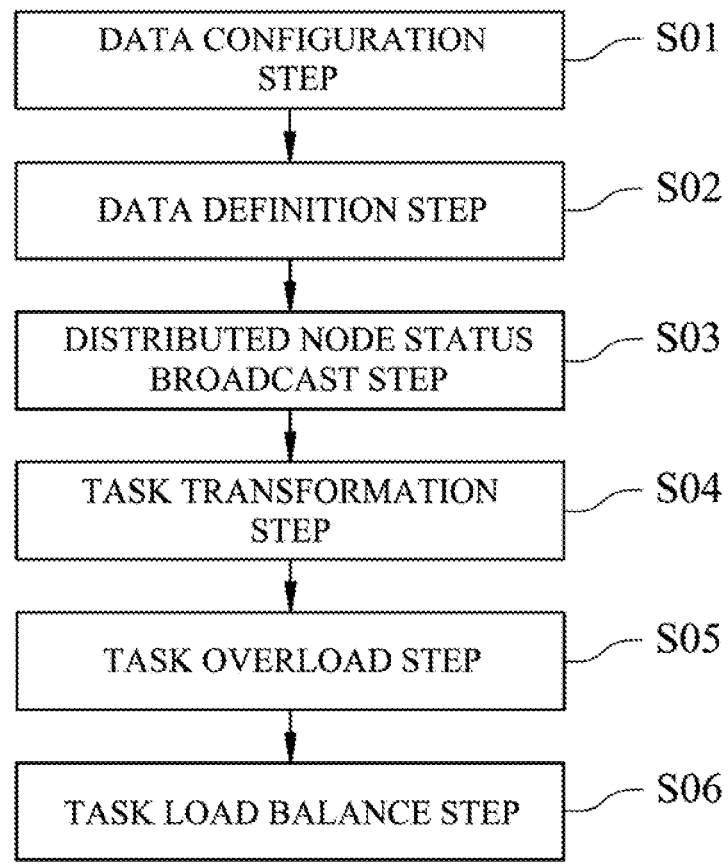
FIG. 3 is an operation flow chart of the distributed network management system of FIG. 1.

FIG. 3 is an operation flowchart of the distributed network management system 100 of FIG. 1. The distributed network management method includes a data configuration step S01, a data definition step S02, a distributed node status broadcast step S03, a task transformation step S04, a task overload step SOS and a task load balance step S06.

The data configuration step S01 is for performing a re-configuring action to a plurality of network messages transmitted through a plurality of nodes. In more detail, the data configuration step S01 is performed by the data configuration module 210, 310 of the distributed network management system 100 for a vehicle. Each of the electronic control units 200 in the sensing end and each of the electronic control units 300 in the processing end is a node in a network.

The data definition step S02 is for performing a pre-defining action corresponding to the network messages. In more detail, the data definition step S02 is performed by the data definition module 220, 320 of the distributed network management system 100 for a vehicle.

The distributed node status broadcast step S03 is for selecting one of the nodes to perform a task assigning action. In more detail, the distributed node status broadcast step S03 is performed by the distributed node status broadcast module 230, 330 of the distributed network management system 100 for a vehicle. The distributed node status broadcast module 230, 330 selects one of the electronic control units 200 or one of the electronic control units 300 as a leading node to lead the other electronic control units 200, 300.

The task transformation step S04 is for selecting one of the nodes to perform a task transferring action. In more detail, the task transferring action S04 is performed by the task transformation module 240, 340 of the distributed network management system 100 for a vehicle. When any one of the electronic control units 300 in the processing end is failed, the original task of the failed electronic control units 300 is transferred by the leading node (selected from one of the electronic control units 200 or one of the electronic control units 300) to another one of the electronic control units 300.

The task overload step S05 is for selecting one of the nodes to perform a task overloading action. In more detail, the task overload step S04 is performed by the task overload module 250, 350 of the distributed network management system 100 for a vehicle. When any one of the electronic control units 300 in the processing end is failed, the failed electronic control units 300 is task overloaded by the leading node (selected from one of the electronic control units 200 or one of the electronic control units 300), and then the task is processed by another one of the electronic control units 300.

The task load balance step S06 is for selecting one of the nodes to perform a task load balancing action. In more detail, the task load balance step S06 is performed by the task load balance module 260, 360 of the distributed network management system 100 for a vehicle. When any one of the electronic control units 300 in the processing end is failed, the failed electronic control units 300 is task load balanced by the leading node (selected from one of the electronic control units 200 or one of the electronic control units 300), and then the task is executed by another one of the electronic control units 300.

In the task transformation step S04, the task overload step S05 and the task load balance step S06, the leading node (selected from one of the electronic control units 200 or one of the electronic control units 300) will determine which node (one of the electronic control units 300 in the sensing end) to execute the task of a failed electronic control unit 300 according to a task load of the nodes (the electronic control units 200 or the electronic control units 300) that are operated normally. Simply speaking, the leading node will assign the task of the fail node to an idle node.

Figure 4A:
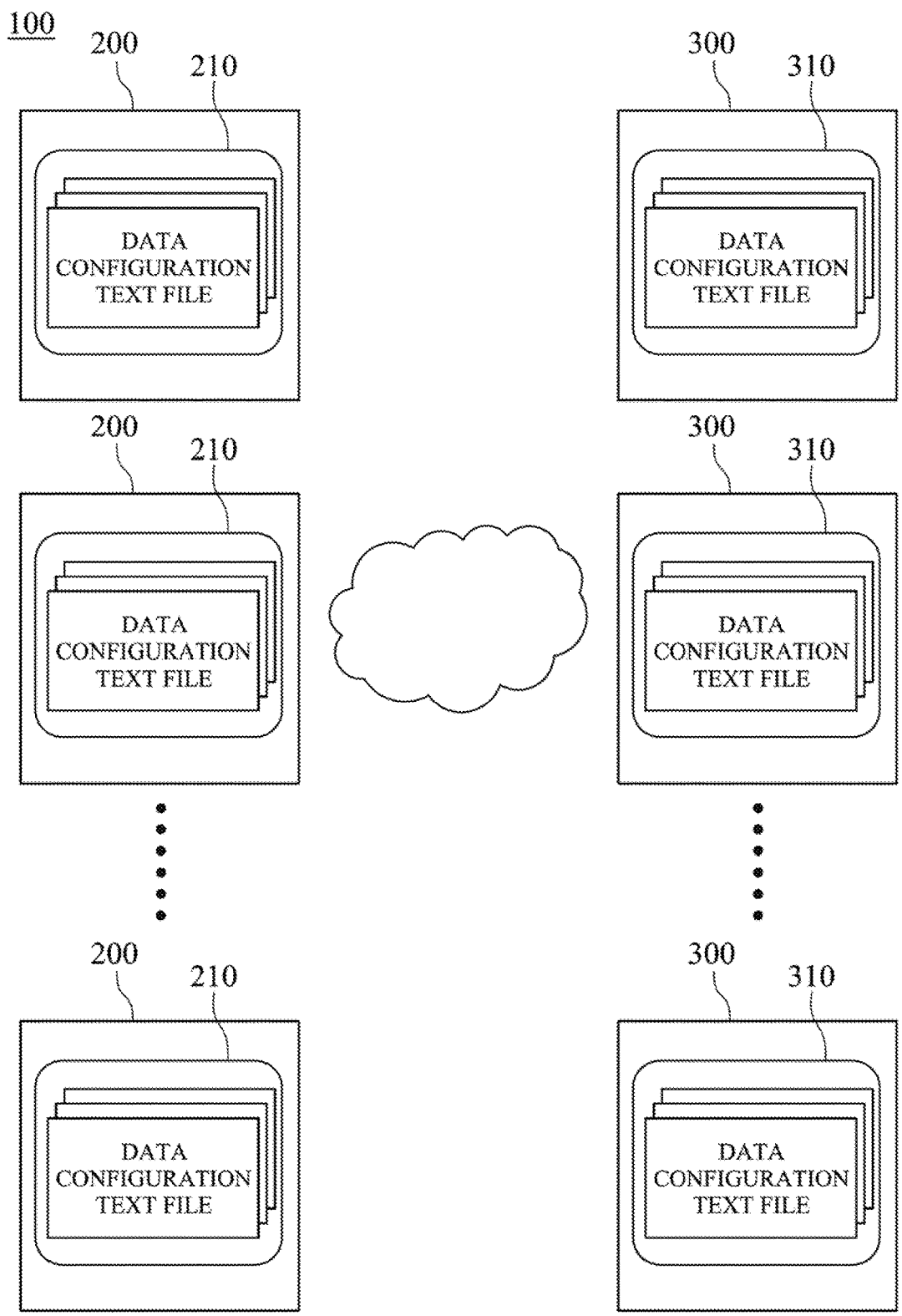
FIG. 4A is a schematic view showing a data configuration step of FIG. 3.
Figure 4B:
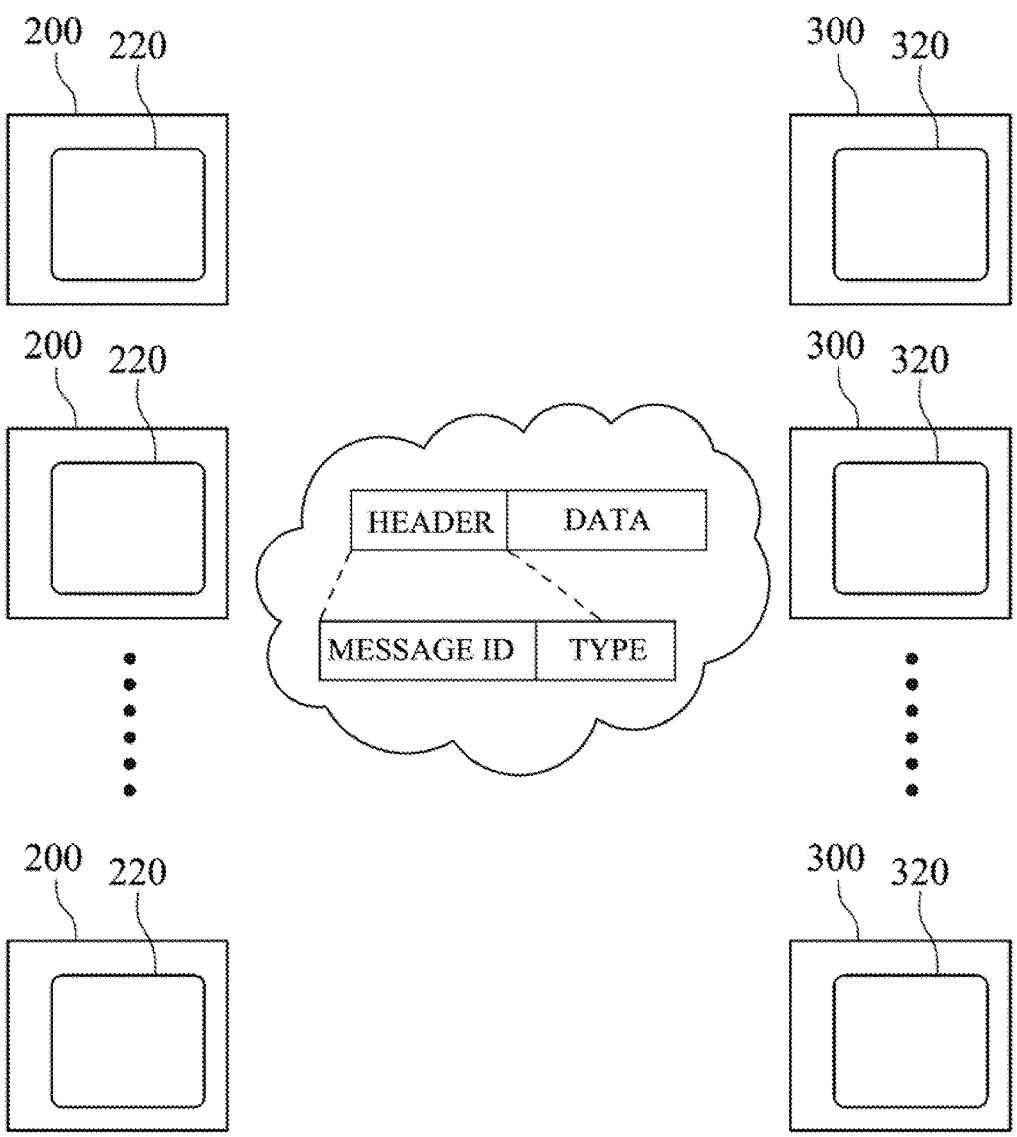
FIG. 4B is a schematic view showing a data definition step of FIG. 3.
Figure 4C:
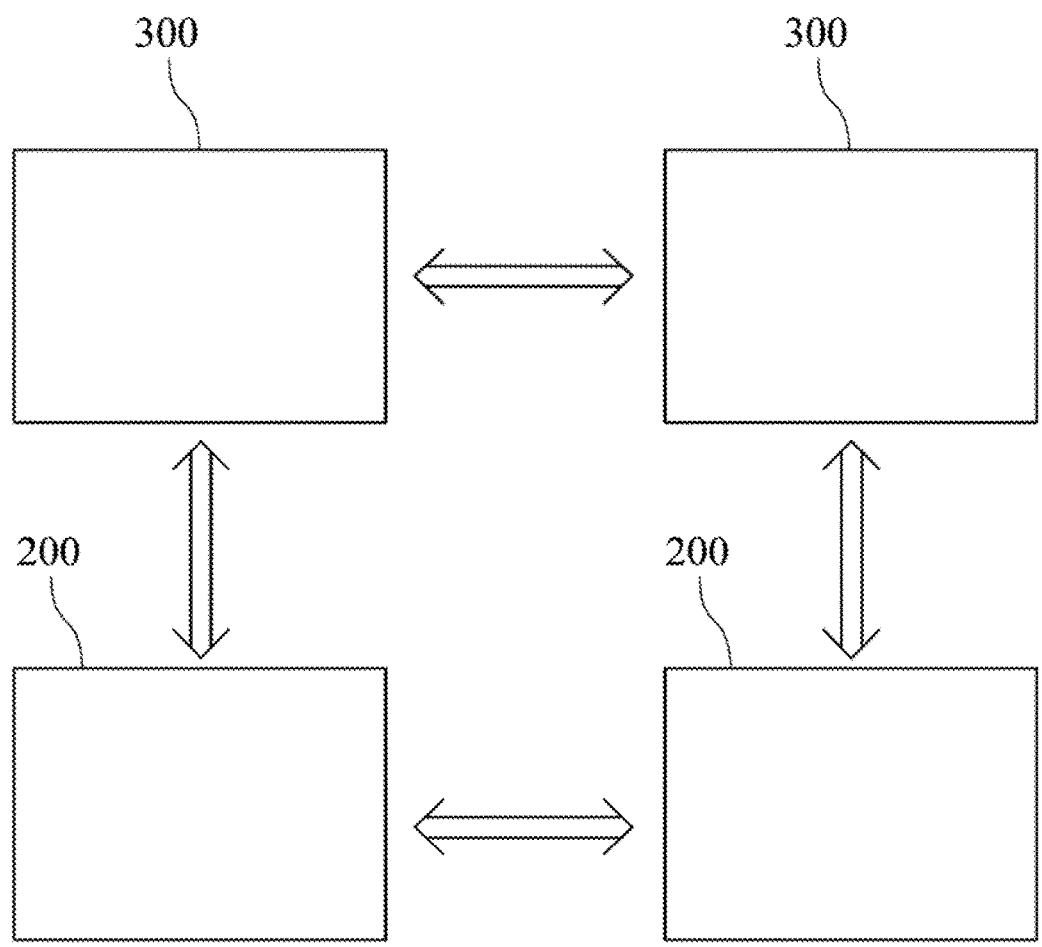
FIG. 4C is a schematic view showing a distributed node status broadcast step of FIG. 3.

FIG. 4A is a schematic view showing a data configuration step SOL of FIG. 3; FIG. 4B is a schematic view showing a data definition step S02 of FIG. 3; FIG. 4C is a schematic view showing a distributed node status broadcast step S03 of FIG. 3.

In FIG. 4B, the data configuration module 210, 310 will perform the data configuration step S01 in FIG. 3, thus the electronic control unit 200 in the sensing end and the electronic control unit 300 in the processing end will store data configuration text file of the network messages from a source or a target. The data configuration step S01 can be performed online without re-encoding all of the network messages.

In FIG. 4B, the data definition module 220, 320 will perform the data definition step S02 in FIG. 3, thus each node (the electronic control unit 200 and the electronic control unit 300) will define a header of the network message, in which the header contains message ID and type.

In FIG. 4C, the distributed node status broadcast module 230, 330 will perform the distributed node status broadcast step S03 in FIG. 3, thus each node (the electronic control unit 200 and the electronic control unit 300) can be operated by a Token Passing network protocol, and the leading node (selected from one of the electronic control units 200 or one of the electronic control units 300) can generate command in accordance with the status of the other nodes (the electronic control unit 200 and the electronic control unit 300). How the nodes can operate through the Token Passing network protocol is a common art in the technology field, thus there is no repeated herein again. In FIG. 4C, the electronic control unit 300 in the processing end is acted as the leading node. The quantity of the electronic control unit 200 and the electronic control unit 300 in the figure is just taken as an example, and is not limited.

Figure 5:
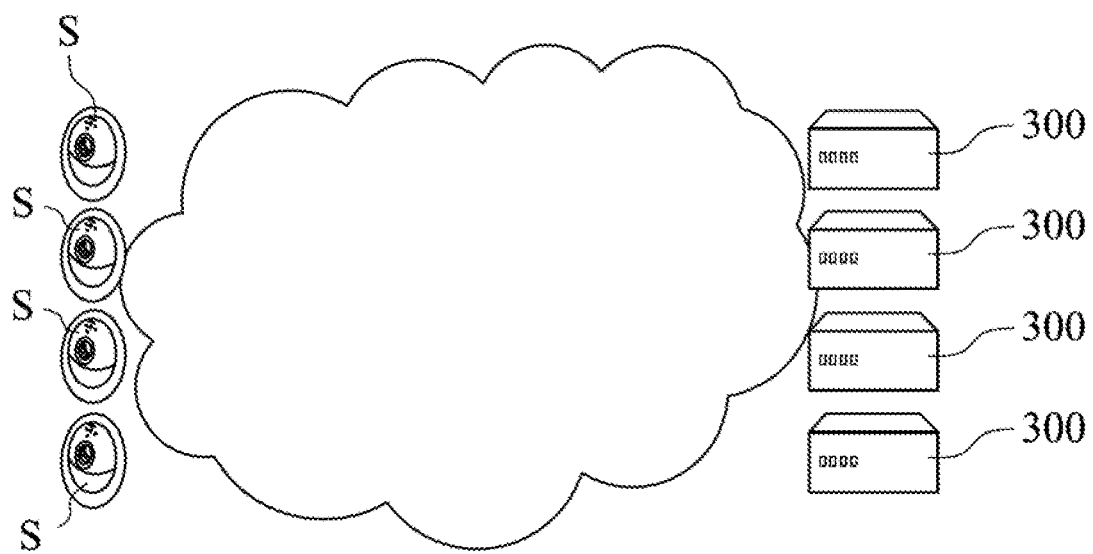
FIG. 5 is a schematic view showing a distributed network management system according to another embodiment of the present disclosure.

FIG. 5 is a schematic view showing a distributed network management system 100 according to another embodiment of the present disclosure. In the embodiment, the distributed network management system 100 for a vehicle is constructed by directly connecting a plurality of sensors S and a plurality of electronic control units 300 in the processing end through a network. The electronic control units 200 in the sensing end in FIG. 1 are not included.

In FIG. 1, the sensor S doesn't have functionality of determining network address, thus it cannot determine to which electronic control unit 300 the sensing data being send. Therefore, extra electronic control units 200 are required in the distributed network management system 100 of FIG. 1, and the task assigning action performed by the leading node (selected from one of the electronic control units 200 or one of the electronic control units 300) can be performed.

In the embodiment of FIG. 5, the sensor S (e.g. IP Camera) has functionality of determining network address, thus it can send sensing data to the electronic control unit 200 which is ordered to execute the task in accordance with the task assigning action performed by the leading node (one of the electronic control units 300).

Figure 6A:
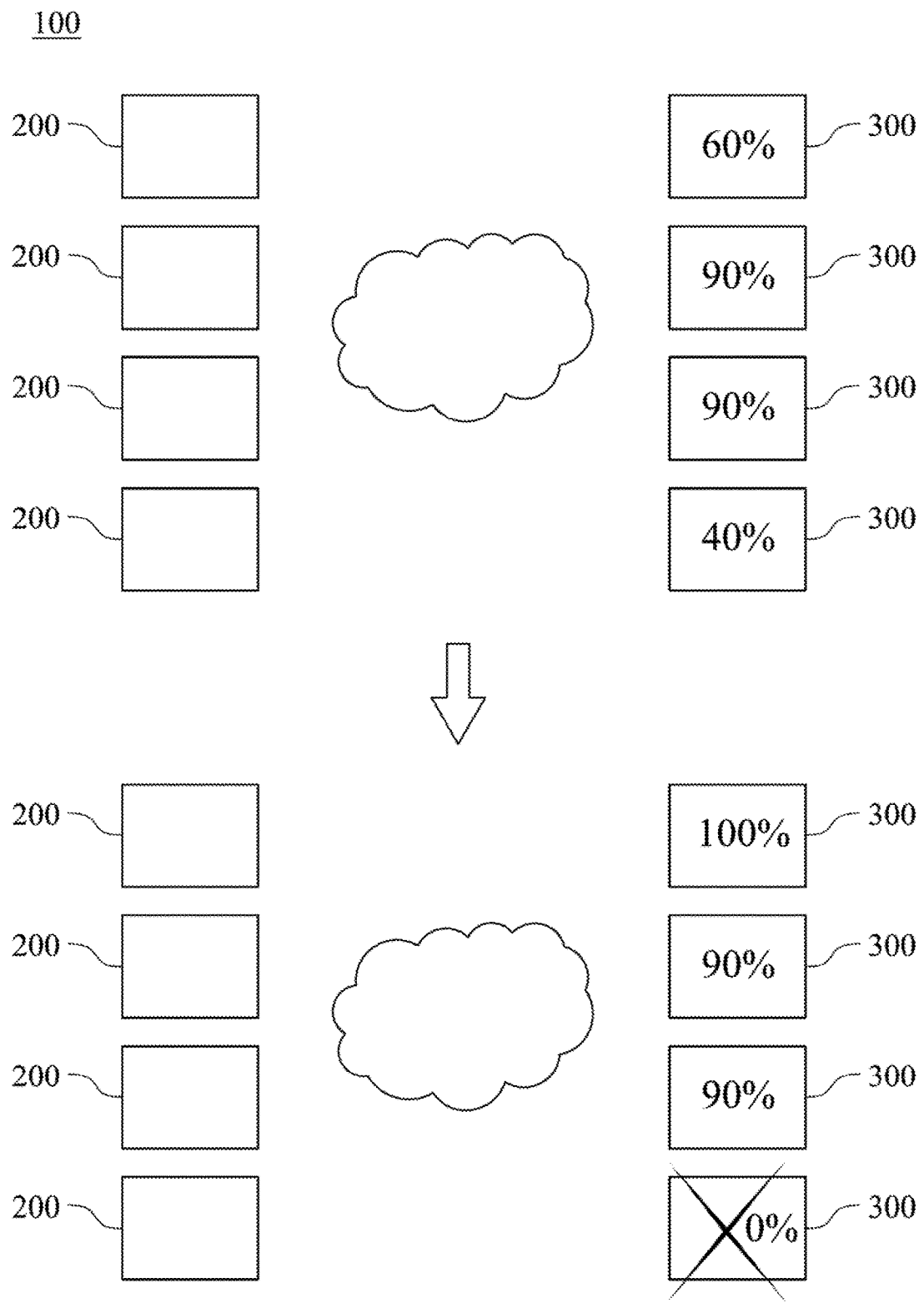
FIG. 6A is a schematic view showing a task transferring action performed by a distributed network management system.
Figure 6B:
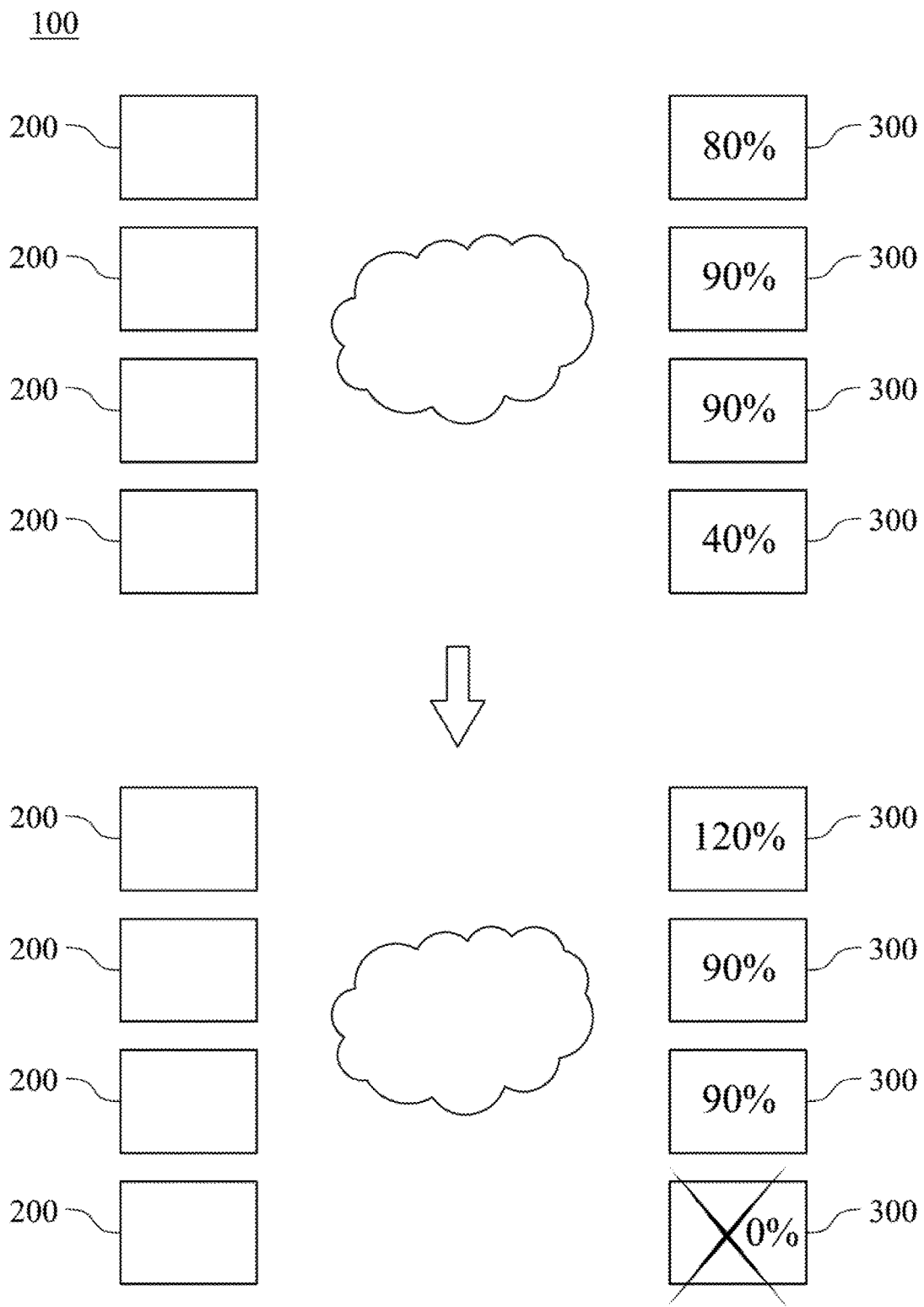
FIG. 6B is a schematic view showing a task overloading action performed by a distributed network management system.
Figure 6C:
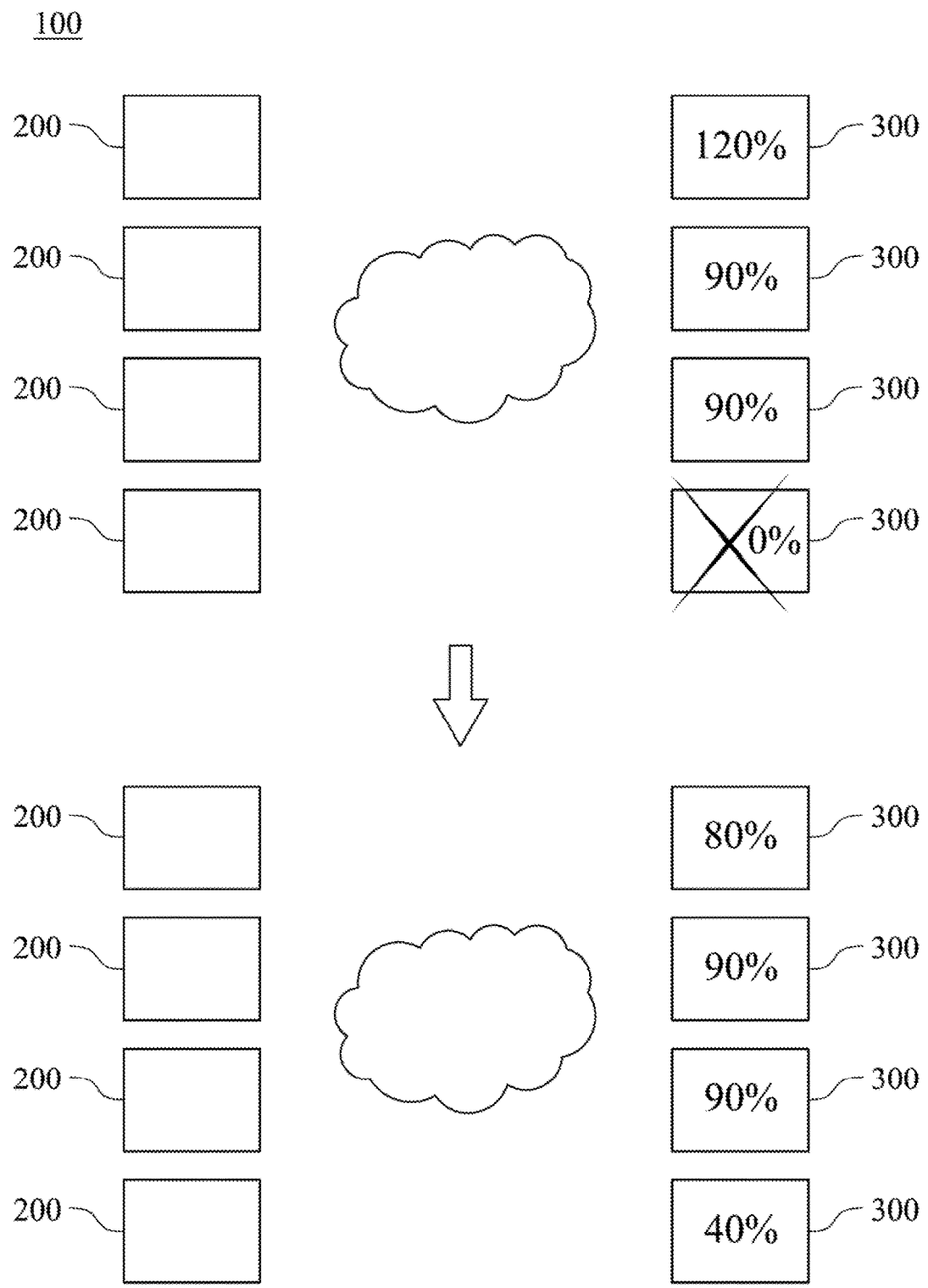
FIG. 6C is a schematic view showing a task load balancing action performed by a distributed network management system.
Figure 6D:
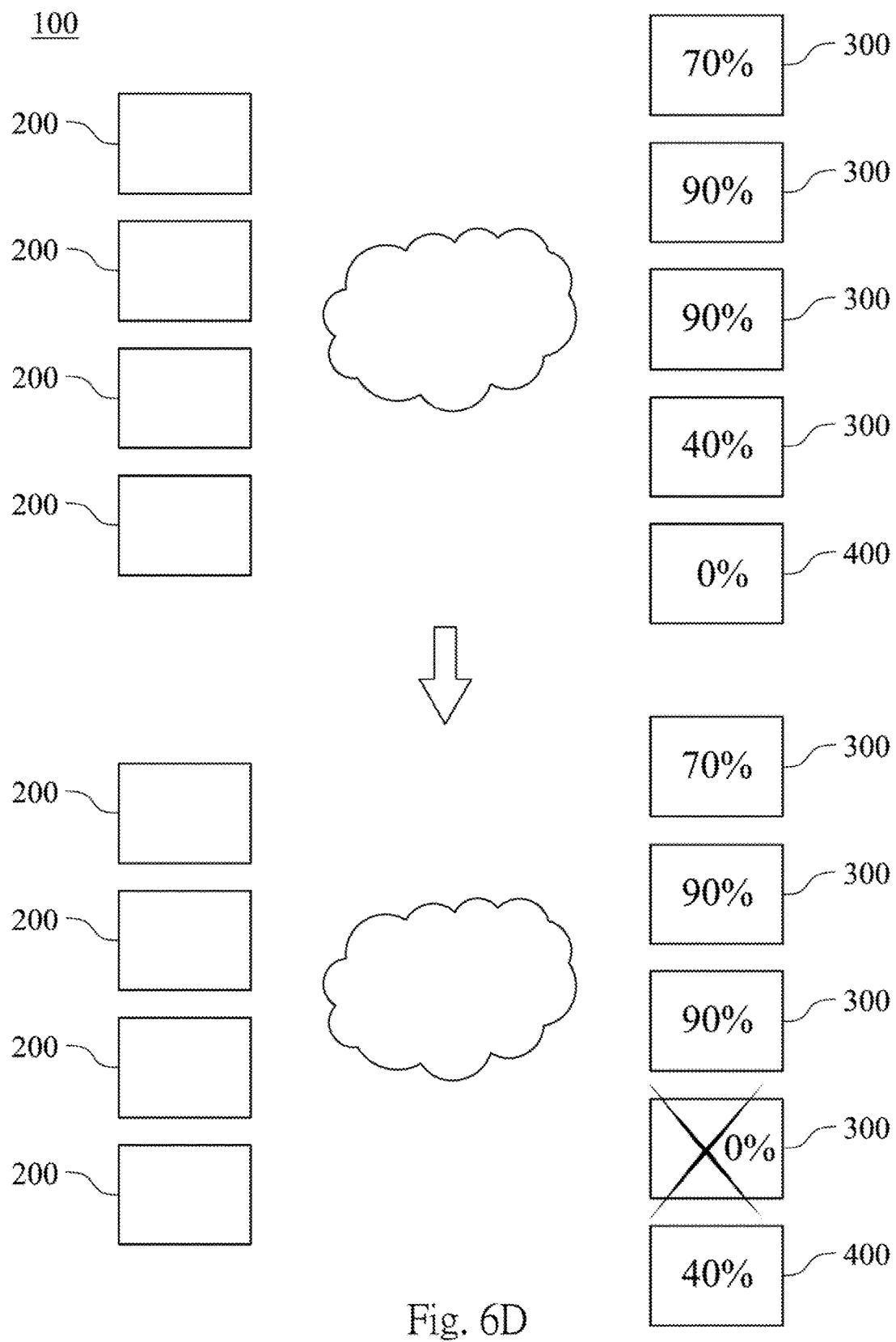
FIG. 6D is a schematic view showing a task backup action performed by a distributed network management system.

FIG. 6A is a schematic view showing a task transferring action performed by a distributed network management system; FIG. 6B is a schematic view showing a task overloading action performed by a distributed network management system; FIG. 6C is a schematic view showing a task load balancing action performed by a distributed network management system; FIG. 6D is a schematic view showing a task backup action performed by a distributed network management system.

In FIG. 6A, the distributed network management system 100 includes four electronic control units 200 in the sensing end and four electronic control units 300 in the processing end. Here assuming that the sensing data transmitted by each of the electronic control units 200 is analyzed and processed by the corresponding electronic control units 300. In FIG. 6A, the task load of the four electronic control units 300 is 60%, 90%, 90% and 40% respectively. Therefore, the corresponding available task load is 40%, 10%, 10%, and 60% respectively. When one of the electronic control units 300 in the processing end is failed, its 40% task load is transferred to another electronic control units 300 having 60% task load, thus the task load will be increased to 100%.

In FIG. 6B, the task load of the four electronic control units 300 is 80%, 90%, 90% and 40% respectively. When one of the electronic control units 300 in the processing end is failed, its 40% task load is transferred to another electronic control units 300 having 80% task load, thus the task load will be increased to 120% and is overloaded.

In FIG. 6C, when the failed electronic control unit 300 in FIG. 6B is repaired, the electronic control unit 300 having 120% task load will recover its 40% task load to the repaired electronic control unit 300.

In FIG. 6D, a portable electronic control unit 400 is added as a backup node. The task load of the five electronic control units 300 is 70%, 90%, 90%, 40%, and 0% respectively. When one of the electronic control units 300 in the processing end is failed, its 40% task load is transferred to another electronic control unit 300 having 0% task load, thereby backup functionality is achieved.

Figure 6E:
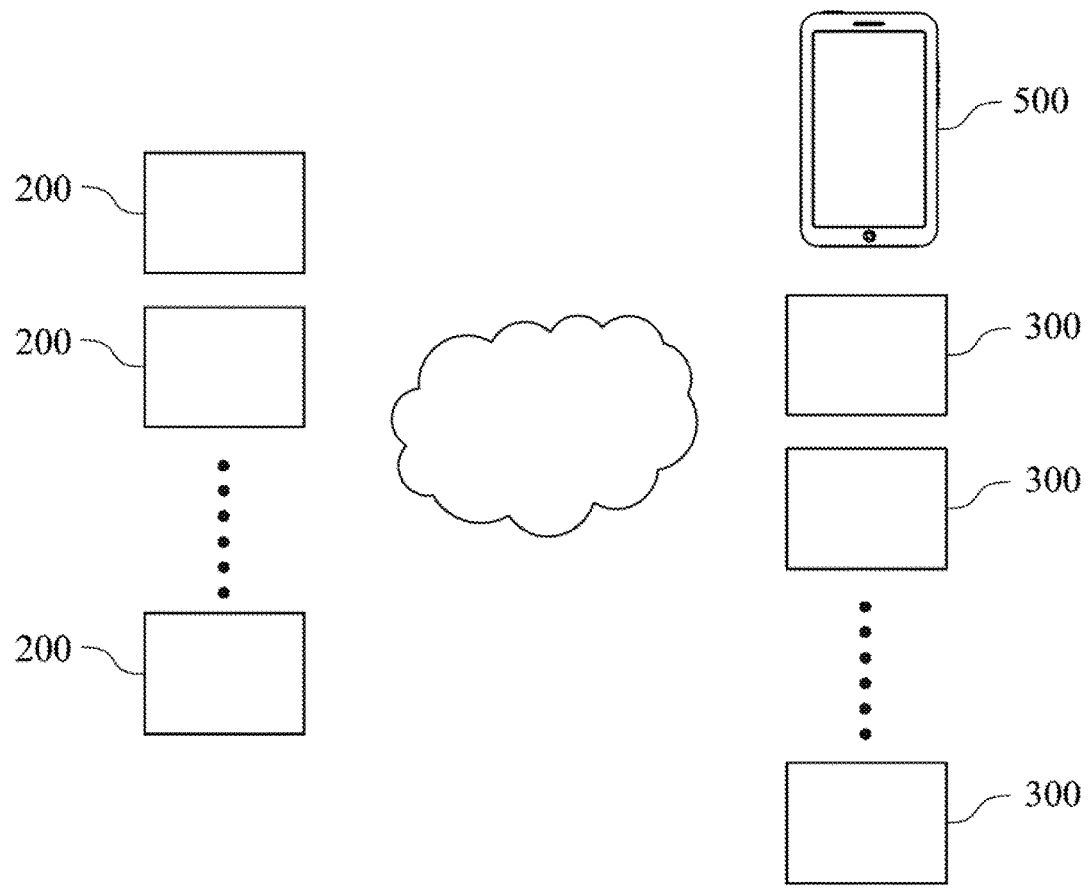
FIG. 6E is a schematic view showing the task backup action performed by the distributed network management system of FIG. 6D.

In FIGS. 6D and 6E, the portable electronic control unit 400 which acted as a backup node can be a smart phone 500. The smart phone 500 is detachably connected to the electronic control unit 200 in the sensing end and the electronic control unit 300 in the processing end through a network. Since the data configuration module, the data definition module, the distributed node status broadcast module, the task transformation module, the task overload module and the task load balance module can be constructed by software, thus the smart phone 500 also can include the functionalities of the data configuration module, the data definition module, the distributed node status broadcast module, the task transformation module, the task overload module and the task load balance module through APPs installed therein. Therefore, the smart phone 500 can be acted as a leading node or an idle node. In the embodiment, the type of the portable electronic control unit 400 is not limited, a Tablet PC or a smart watch can also be acted as the portable electronic control unit 400.

Figure 7:
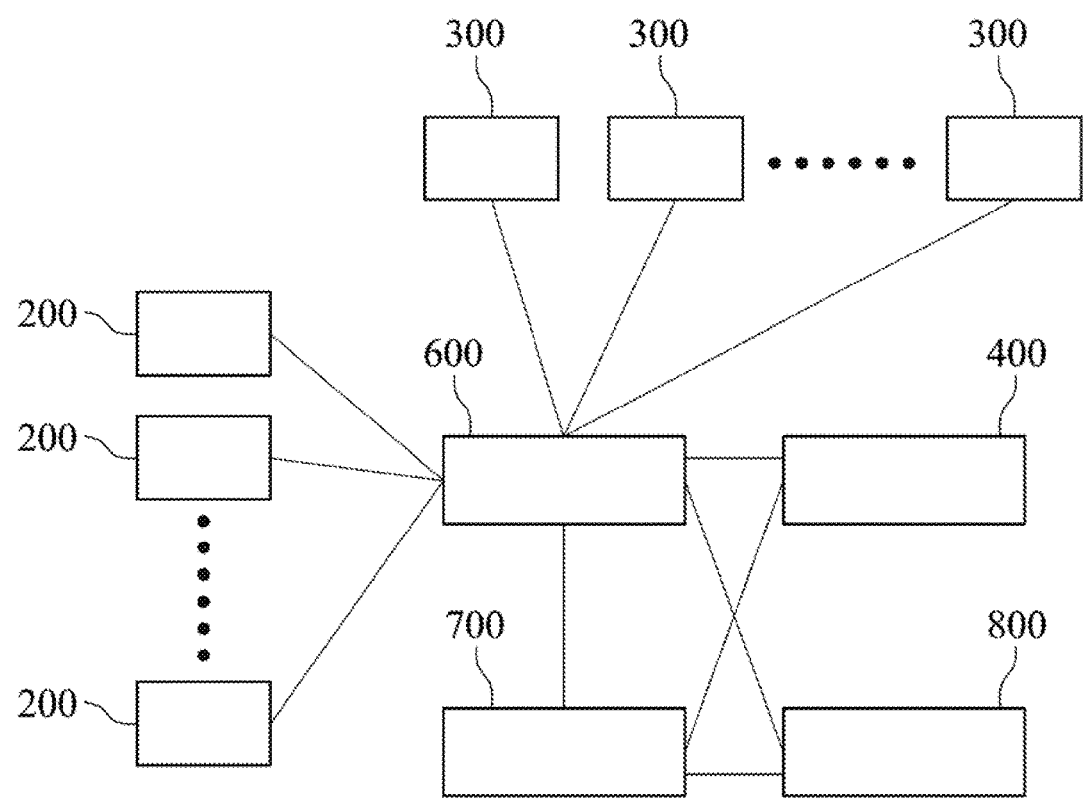
FIG. 7 is a schematic view showing a portable electronic control unit being added to a distributed network management system.

FIG. 7 is a schematic view showing a portable electronic control unit 400 being added to a distributed network management system. In FIG. 7, the electronic control unit 200, the electronic control unit 300 and the portable electronic control unit 400 transmit network messages through a switch 600 and a wireless switch 700. Concerning transmission speed and cost, the electronic control unit 200 and the electronic control unit 300 are connected through the switch 600. And concerning accessibility and expandability, the portable electronic control unit 400 is connected to the electronic control unit 200 and the electronic control unit 300 through the wireless switch 700. Furthermore, when the network messages are analyzed, it can be shown on a displayer 800 connected to the switch 600 and the wireless switch 700. Therefore, driving information can be provided to the driver. In one example, the network used here is an Ethernet or a Wi-Fi network, and the switch 600 and the wireless switch 700 can be a network router.

Figure 8:
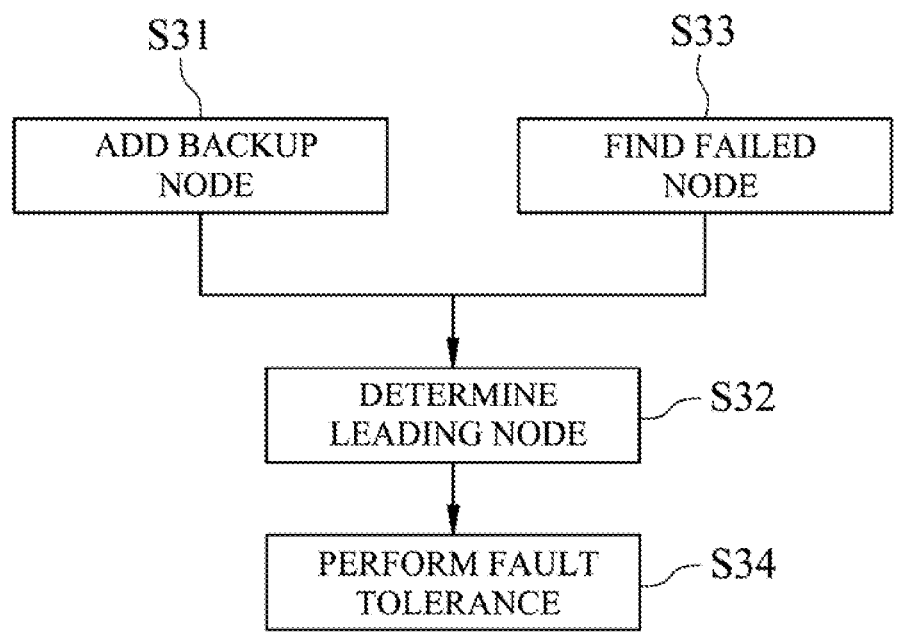
FIG. 8 is a flowchart showing a backup node being added and a failure node being found.

FIG. 8 is a flowchart showing a backup node being added and a failure node being found in the distributed network management system 100 for a vehicle. In a step S31, the portable electronic control unit 400 is acted as a backup node and is added to the distributed network management system 100. When the portable electronic control unit 400 is added, the other existing nodes will be informed. In a step S33, a failure node is found in accordance with the transmitted network messages. After the step S33 or the step S31, a step S32 is performed to select a leading node to determine the consistency of the task assignment and the transmission of the Token Passing. In a step S34, a fault tolerance procedure is performed. The leading node performs a task transferring action, a task overloading action, a task load balancing action and a task backup action and provides matching data and messages to all nodes.

In the aforementioned distributed network management system and method thereof for a vehicle, the data configuration module, the data definition module, the distributed node status broadcast module, the task transformation module, the task overload module and the task load balance module can achieve the functionalities of complete fault analysis, fault tolerance and backup by performing task transformation, task overload and task load balance; and those functionalities are not available on the conventional network system for a vehicle.

Furthermore, the portable electronic control unit can be added to the system anywhere and can be acted as a leading node or an idle node. The portable electronic control unit can be a smart phone that can be plug and play. The smart phone can also perform the similar data configuration action and data definition action, and order the electronic control unit in the processing end to perform the task transferring action, the task overloading action and the task load balancing action for achieving backup functionality.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A distributed network management system for a vehicle, the distributed network management system being disposed on a plurality of electronic control units that are inter-connected by a distributed network, wherein each of the electronic control units is selectable as a leading node or an idle node in the distributed network, the distributed network management system comprising:
a plurality of data configuration modules, wherein each of the data configuration modules is disposed on each of the electronic control units, and each of the data configuration modules is configured for performing a re-configuring action to a plurality of network messages;
a plurality of data definition modules, wherein each of the data definition modules is disposed on each of the electronic control units and is connected to each of the data configuration modules, and each of the data definition modules is configured for performing a pre-defining action corresponding to the network messages;
a plurality of distributed node status broadcast modules, wherein each of the distributed node status broadcast modules is disposed on each of the electronic control units, and each of the distributed node status broadcast module is configured for selecting one of the electronic control units to perform a task assigning action;
a plurality of task transformation modules, wherein each of the task transformation modules is disposed on each of the electronic control units, and each of the task transformation modules is configured for selecting one of the electronic control units to perform a task transferring action;
a plurality of task overload modules, wherein each of the task overload modules is disposed on each of the electronic control units, and each of the task overload modules is configured for selecting one of the electronic control units to perform a task overloading action; and
a plurality of task load balance modules, wherein each of the task load balance modules is disposed on each of the electronic control units, and each of the task overload modules is configured for selecting one of the electronic control units to perform a task load balancing action;
wherein the electronic control unit selected as the leading node performs the task assigning action to order the other of the electronic control units through one of the distributed node status broadcast modules; when one of the electronic control units is failed and cannot perform any tasks, the electronic control unit selected as the leading node performs the task transferring action, the task overloading action and the task balancing action to order the the electronic control unit selected as the idle node to perform the tasks of the failed electronic control unit through the task transformation modules, the task overload modules and the task balance modules of the electronic control unit selected as the leading node.

2. The distributed network management system of claim 1, wherein the electronic control units are communicated with each other through a Token Passing network protocol.

3. The distributed network management system of claim 1, wherein the re-configuring action of each of the data configuration modules is to define a source and a target of each of the network messages.

4. The distributed network management system of claim 1, wherein the data pre-defining action of each of the data definition modules is to define a type and a message ID of each of the network messages.

5. The distributed network management system of claim 1, wherein the distributed network management system comprises a sensing end and a processing end, some electronic control units are disposed on the sensing end for executing order data of the network messages and receiving sensing data of the network messages; other electronic control units are disposed on the processing end for processing the sensing data and outputting the order data.

6. A distributed network management system for a vehicle, comprising:
a plurality of electronic control units, wherein the electronic control units are inter-connected by a distributed network;
a portable electronic control unit detachably connected to the electronic control units by the distributed network;
a plurality of data configuration modules, wherein each of the data configuration modules is disposed on each of the electronic control units and the portable electronic control unit, and each of the data configuration modules is configured for performing a re-configuring action to a plurality of network messages;
a plurality of data definition modules, wherein each of the data definition modules is disposed on each of the electronic control units and the portable electronic control unit and is connected to each of the data configuration modules, and each of the data definition modules is configured for performing a pre-defining action corresponding to the network messages;

a plurality of distributed node status broadcast modules, wherein each of the distributed node status broadcast modules is disposed on each of the electronic control units and the portable electronic control unit, and each of the distributed node status broadcast module is configured for enabling the portable electronic control unit to perform a task assigning action;

a plurality of task transformation modules, wherein each of the task transformation modules is disposed on each of the electronic control units and the portable electronic control unit, and the portable electronic control unit performs a task transferring action through one of the electronic control units;

a plurality of task overload modules, wherein each of the task overload modules is disposed on each of the electronic control units and the portable electronic control unit, and the portable electronic control unit performs a task overloading action through one of the task overload modules; and a plurality of task load balance modules, wherein each of the task load balance modules is disposed on each of the electronic control units and the portable electronic control unit, and the portable electronic control unit performs a task load balancing action through one of the task load balance modules;

wherein the portable electronic control unit is selectable as a leading node to perform the task assigning action to order the electronic control units through one of the distributed node status broadcast modules; when one of the electronic control units is failed and cannot perform any tasks, the portable electronic control unit selected as the leading node performs the task transferring action, the task overloading action and the task balancing action to order the electronic control unit selectable as an idle node to execute the tasks of the failed electronic control unit through the task transformation modules, the task overload modules and the task balance modules of the portable electronic control unit selected as the leading node.

7. The distributed network management system of claim 6, further comprising a plurality of portable electronic control units.

8. The distributed network management system of claim 6, wherein the portable electronic control unit is a smart phone, a tablet PC or a smart watch.

9. The distributed network management system of claim 6, wherein the electronic control units and the portable electronic control unit are communicated with each other through a Token Passing network protocol.

10. The distributed network management system of claim 6, wherein the data re-configuring action of each of the data configuration modules is to define a source and a target of each of the network messages.

11. The distributed network management system of claim 6, wherein the data pre-definition action of each of the data definition modules is to define a type and a message ID of each of the network message.

12. The distributed network management of claim 6, wherein some electronic control units are configured for executing order data of the network messages and receiving sensing data of the network messages; other electronic control units are configured for processing the sensing data and outputting the order data.

13. A distributed network management method for a vehicle, the distributed network management method comprising:
    a data configuration step for preforming a re-configuring action to a plurality of network messages transmitted through a plurality of nodes;
    a data definition step for performing a pre-defining action corresponding to the network messages;
    a distributed node status broadcast step for selecting one of the electronic control units to perform a task assigning action;
    a task transformation step for selecting one of the electronic control units to perform a task transferring action;
    a task overload step for selecting one of the electronic control units to perform a task overloading action; and
    a task load balance step for selecting one of the electronic control units to perform a task load balancing action.

14. The distributed network management method of claim 13, wherein in the data configuration step, the data re-configuring action is performed to define a source and a target of each of the network messages.

15. The distributed network management method of claim 13, wherein in the data definition step, the pre-defining action is performed to define a type and a message ID of each of the network messages.

16. The distributed network management method of claim 13, wherein some electronic control units are configured for executing order data of the network messages and receiving sensing data of the network messages; other electronic control units are configured for processing the sensing data and outputting the order data.

17. A distributed network management method for a vehicle, the distributed network management method comprising:
    a first step for preforming a re-configuring action and a pre-defining action to a plurality of network messages transmitted through a plurality of nodes;
    a second step for defining a leading node form the nodes;
    a third step for detecting a failed node from the nodes;
    a fourth step for defining at least one idle node by the leading node according to an available task load of each of the nodes, thereby assigning a task of the failed node to the idle node;
    a fifth step for defining an overload node by the leading node according to the available task load of each of the nodes; and
    a sixth step for equally distributing an overload task of the overload node to the leading node and each of the other nodes;
    wherein the nodes are a plurality of electronic control units that are capable of transmitting network messages with each other.

18. The distributed network management method of claim 17, further comprising:
    a seventh step for fixing the failed node to a recovered node; and
    an eighth step for sending back the task assigned to the idle node in the fourth step to the recovered node.

19. The distributed network management method of claim 17, wherein in the first step, the re-configuring action is performed to define a source and a target of each of the network messages.

20. The distributed network management method of claim 17, wherein in the first step, the pre-defining action is performed to define a type and a message ID of each of the network messages.

21. The distributed network management method of claim 17, wherein some of the electronic control units are configured for executing order data of the network messages and receiving sensing data of the network messages; other of the electronic control units are configured for processing the sensing data and outputting the order data.

* * * * *